United States Patent [19]
Mossman

[11] Patent Number: 5,195,309
[45] Date of Patent: Mar. 23, 1993

[54] PLASTIC CROP DIVIDERS FOR A ROW CROP HEADER

[75] Inventor: Michael W. Mossman, Silvis, Ill.

[73] Assignee: Deere & Company

[21] Appl. No.: 751,277

[22] Filed: Aug. 28, 1991

[51] Int. Cl.$^5$ ............................................. A01D 45/02
[52] U.S. Cl. ........................................ 56/119; 56/105
[58] Field of Search ................... 56/66, 69, 82, 88, 93, 56/94, 105, 109, 119

[56] References Cited

U.S. PATENT DOCUMENTS

| | | | |
|---|---|---|---|
| 3,759,021 | 9/1973 | Schreiner et al. | 56/106 |
| 3,982,384 | 9/1976 | Rohweder et al. | 56/106 |
| 4,403,467 | 9/1983 | Baugh | 56/119 |
| 4,446,682 | 5/1984 | Jennen et al. | 56/119 |
| 4,493,181 | 1/1985 | Glendenning et al. | 56/119 X |
| 4,502,270 | 3/1985 | Shupert | 56/119 X |
| 4,538,404 | 9/1985 | Heimark, Jr. et al. | 56/119 X |
| 4,729,212 | 3/1988 | Rabitsch | 56/119 |
| 4,835,954 | 6/1989 | Enzmann | 56/303 |
| 4,899,526 | 2/1990 | Harris | 56/17.5 X |

Primary Examiner—George A. Suchfield

[57] ABSTRACT

A row crop header for an agricultural harvesting machine having a plurality of row crop dividers defining crop gathering gaps. Each divider comprises a semiconical portion and a semicyclindrical portion that are formed roto molded polyethylene. Both portions are hollow double walled self-supporting polyethylene structures. The semiconical portion and the semicylindrical portion are pivotally secured to one another so they can be jacknifed into a transport configuration. The semicylindrical portion of the divider is pivotally mounted to a transverse frame by a first mounting assembly. A second mounting assembly is mounted to outwardly extending frame portions. The second mounting assembly has an upwardly extending pin which engages an aperture in the semicylindrical portion and a supporting rail which supports the bottom of the semiconical portion. The support rail can be vertically adjusted to change the vertical position of the semiconical portion.

30 Claims, 7 Drawing Sheets

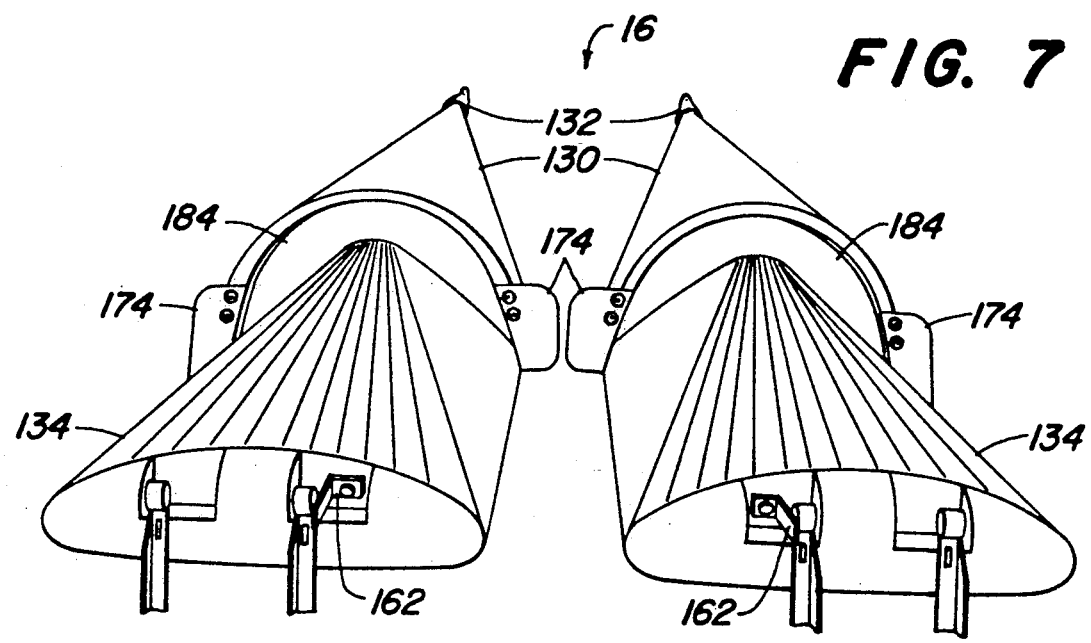

PLASTIC CROP DIVIDERS FOR A ROW CROP HEADER

BACKGROUND OF THE INVENTION

1. Field of the Invention

The invention is directed to a row crop header for an agricultural harvesting machine having hollow self-supporting plastic crop dividers.

2. Description of the Prior Art

Agricultural harvesting machines, such as combines, maybe provided with a row crop header for harvesting row crops. A typical row crop header comprises a plurality of crop dividers. Adjacent dividers define a crop gathering gap into which the crop being harvested is drawn by gathering units. The gathering units may comprise gathering chains or serpentine belts. The gathering units direct the crop to the harvesting units which may comprise a cutting mechanism or snapping rolls. The harvesting units harvest the crop located in the crop gathering gap. The harvested crop is directed to the feederhouse of the combine by an auger. For a row crop header of the type disclosed in U.S. Pat. No. 3,808,783, which is assigned to the assignee of the present invention and which is incorporated herein by reference, the gathering units comprise serpentine gathering belts and the harvesting units comprise rotating cutting discs located beneath the gathering belts are used to sever the crop from the ground.

Another type of row crop header is the corn header which is designed to harvest corn. With a corn header such as that disclosed in U.S. Pat. No. 3,759,021, assigned to the assignee of the present patent application and incorporated herein by reference, the gathering units comprise gathering chains. Located beneath the gathering chains are the harvesting units that comprise snapper rolls which engage the corn stalk and pull it rapidly downwardly. When the ear of corn reaches the small gap formed by the snapper rolls the ear is snapped off and carried to the gathering trough of the corn header by the gathering chains. The stalk is continually pulled downward and returned to the field.

Row crop dividers define the gathering gaps. Row crop dividers are typically sheet metal fingers that extend outwardly from the header to direct the crops to the appropriate gathering gaps. Sheet metal crop dividers suffer from certain disadvantages. First, they are relatively heavy and this weight is located outward from the base of the combine resulting in a large moment arm on the front axle of the combine. Second, the paint on the sheet metal tends to wear resulting in bare metal that starts to rust. Third, the sheet metal is relatively rigid and corn ears tend to bounce off the crop dividers and back into the field resulting in harvesting losses. Fourth, in cold moist conditions water condenses on the sheet metal dividers which increases the adherence of leaves and other field debris to the dividers causing plugging of the gathering units.

SUMMARY

It is an object of the present invention to provide lighter row crop dividers.

It is another object of the present invention to provide row crop dividers that do not rust and maintain their original color.

It is another object of the present invention to reduce harvesting losses.

It is another object of the present invention to provide row crop dividers that maintain a good coefficient of friction in cool moist conditions.

These objects are satisfied by using hollow self-supporting plastic crop dividers on a row crop header. It is a feature of the present invention that the row crop dividers are formed by roto molded polyethylene.

Each of the plastic row crop dividers, including the end units, are hollow self-supporting polyethylene structures. Each of the row crop dividers is provided with a semicylindrical portion and a semiconical portion that is pivotally coupled to the semicylindrical portion. Both portions are hollow doubled walled structures that are self-supporting. The semicylindrical portion of the row crop dividers is pivotally secured to the frame of the header by a first mounting assembly. Upstanding members are bolted to the frame and are provided with transverse mounting pins forming pivot shafts that engage two transverse apertures located in each semicylindrical portion. A second mounting assembly is mounted to the frame in front of the snapping rolls for supporting the front end of the semicylindrical portion of the row crop divider. The second mounting assembly is provided with an upwardly extending pin that engages an aperture formed in the semicylindrical portion. A supporting rail is mounted to the second mounting assembly to provide a supporting surface on which the crop divider rests. The second mounting assembly is provided with a mounting bracket having a holding notch which provides a holder for the gathering tip of the semiconical portion when the divider is folded into its transport configuration.

BRIEF DESCRIPTION OF THE DRAWINGS

FIG. 7 is a rear perspective view of two assembled center row crop dividers.

DETAILED DESCRIPTION

Figure 1:
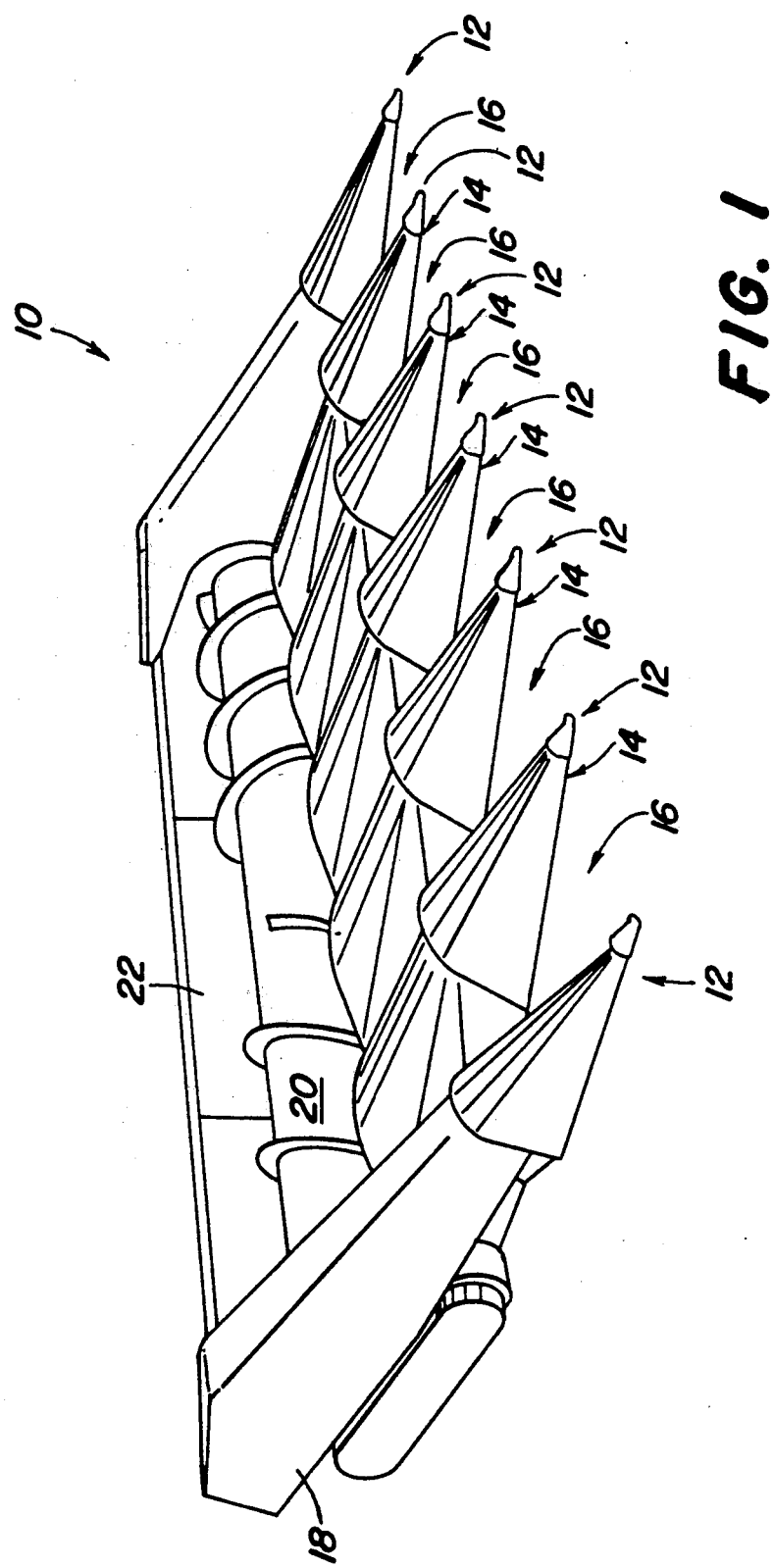
FIG. 1 is a perspective view of a row crop header.

FIG. 1 is a perspective view of a corn header 10. The platform is provided with two end row crop dividers 12 and five center row crop dividers 14. The row crop dividers define six crop gathering gaps 16. The gathering and harvesting units are mounted to a platform frame 18. A transverse auger 20 is positioned on the frame 18 to gather the crop into a central area where it can be directed through an opening 22 to a feederhouse on a combine. It should be noted that the invention will be described in a corn header context, but that it could also be applied to any row crop header. The major defining feature being the type of gathering and harvesting units that are positioned in the crop gathering gaps. In addition the invention could be used for corn pickers rather than headers for combines.

Figure 2:
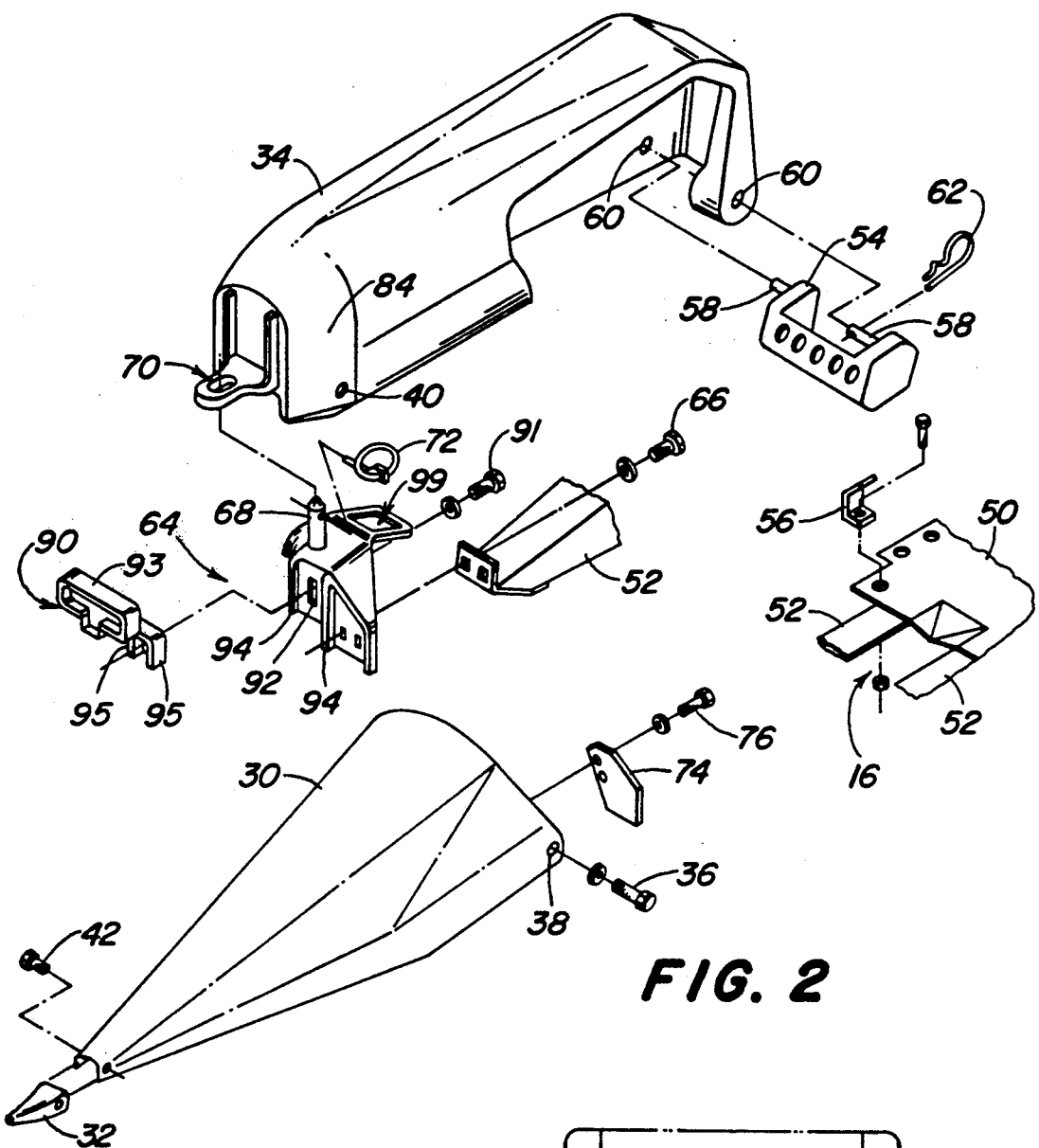
FIG. 2 is an exploded perspective view of the end row crop divider.

The end row crop divider is best illustrated in FIG. 2. The row crop divider comprises a semiconical forward portion 30 having a gathering point 32, and a semicylindrical portion 34. The semiconical portion is pivotally coupled to the semicylindrical portion by bolts 36 passing through apertures 38 and 40. The gathering point is held in place at the tip of the semiconical portion by bolt 42. The base end of the semiconical portion is nested over the front end of the semicylindrical portion.

The frame 18 of the harvesting platform is relatively conventional having a transverse member 50 extending across the platform. The transverse member 50 is provided with a series of forwardly extending arms 52, defining crop gathering gaps 16. The gathering and harvesting units are mounted to the forwardly extending arms under the dividers and extend into the crop gathering gaps. In a corn header the gathering units comprise gathering chains and the harvesting units comprise snapper rolls. In a non-corn row crop header the gathering units comprise serpentine belts and the harvesting units cutting discs.

Figure 2A:
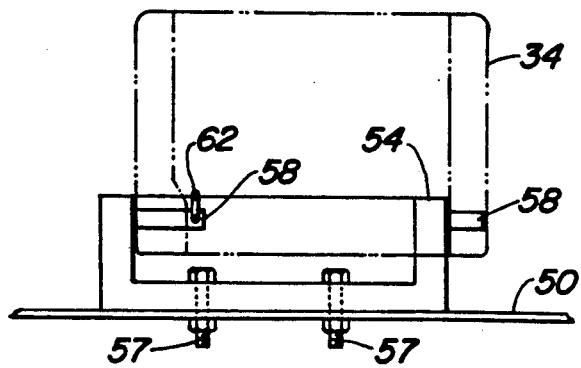
FIG. 2A is an assembled rear view of the end row crop divider.
Figure 3:
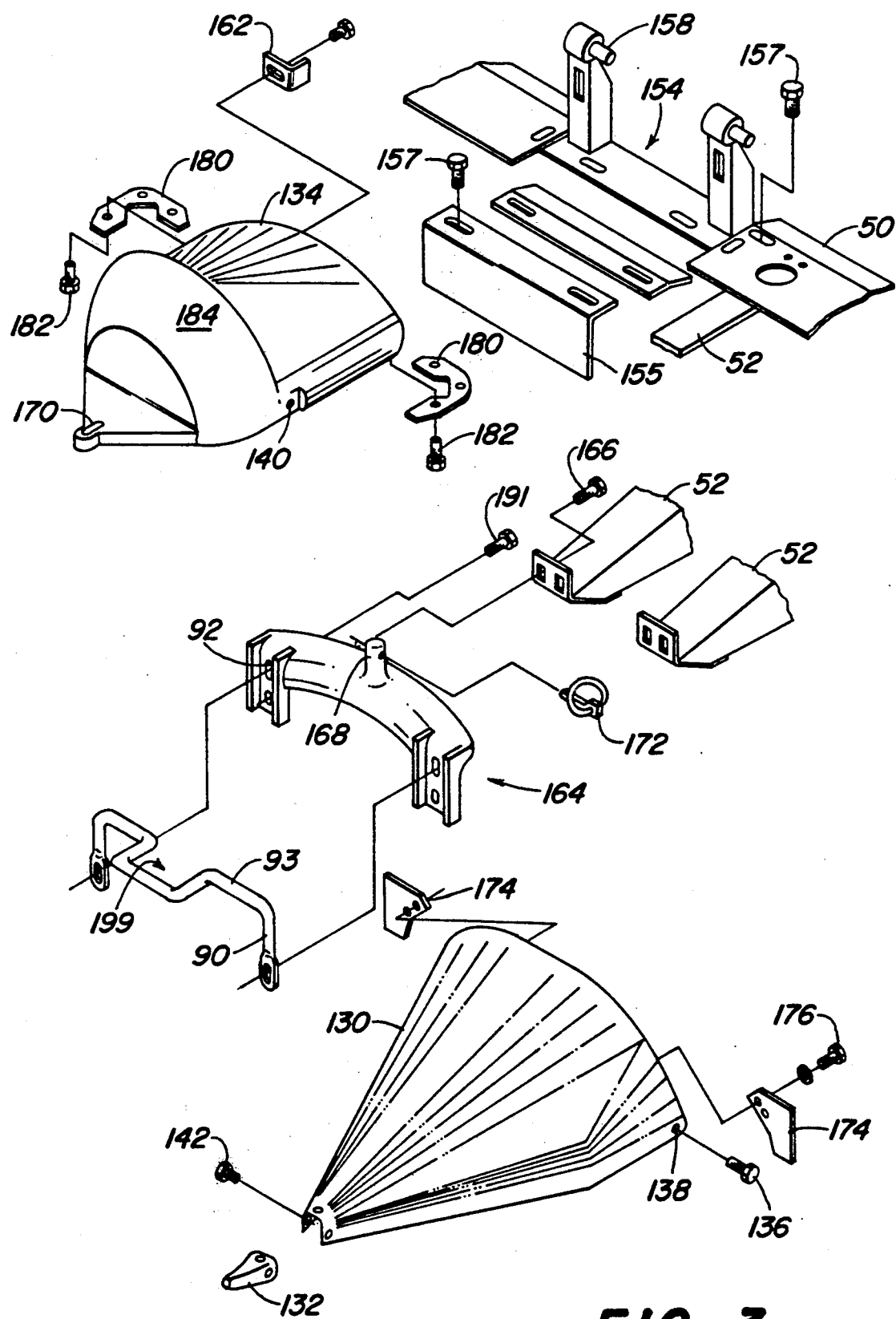
FIG. 3 is an exploded perspective view of a center row crop divider.

For the end row crop dividers 12 a first mounting assembly 54 is secured to the transverse member 50 by bolts 57, best illustrated in FIG. 2A. The mounting assembly is provided with two outwardly extending mounting pins 58 that engage apertures 60 formed in the rear of semicylindrical portion 34. The semicylindrical portion is pivotally mounted on the mounting pins where it may be pivoted upward into a transport position. The crop divider is secured to the mounting assembly by cotterpin 62. The crop divider can be removed by removing the cotterpin and transversely sliding the semicylindrical portion outwardly so that the apertures no longer engage the mounting pins.

A second mounting assembly 64 is secured to the outermost forwardly extending member 52 by two bolts 66, only one shown. The second mounting assembly is provided with an upwardly extending pin 68 which is designed to engage aperture 70 on semicylindrical portion 34 when the divider is mounted in its crop harvesting position. A cotterpin 72 holds the divider in position on pin 68.

The second mounting assembly is also provided with a supporting rail 90 that is mounted to the second mounting assembly 64 by bolt 91 passing through elongated aperture 92. The top of the supporting rail is provided with a support surface 93 on which the semiconical portion rests. The vertical position of the supporting rail 90 can be adjusted by loosening bolt 91 and moving supporting rail 90 up and down in the channel formed by side rails 94. The side rails 94 engage the side surfaces 95 of the supporting rail and prevent the supporting rail from twisting on bolt 91. The bolt moves with the supporting rail up and down in the elongated aperture 92 and is tightened when the supporting rail is correctly vertically positioned.

Figure 4:
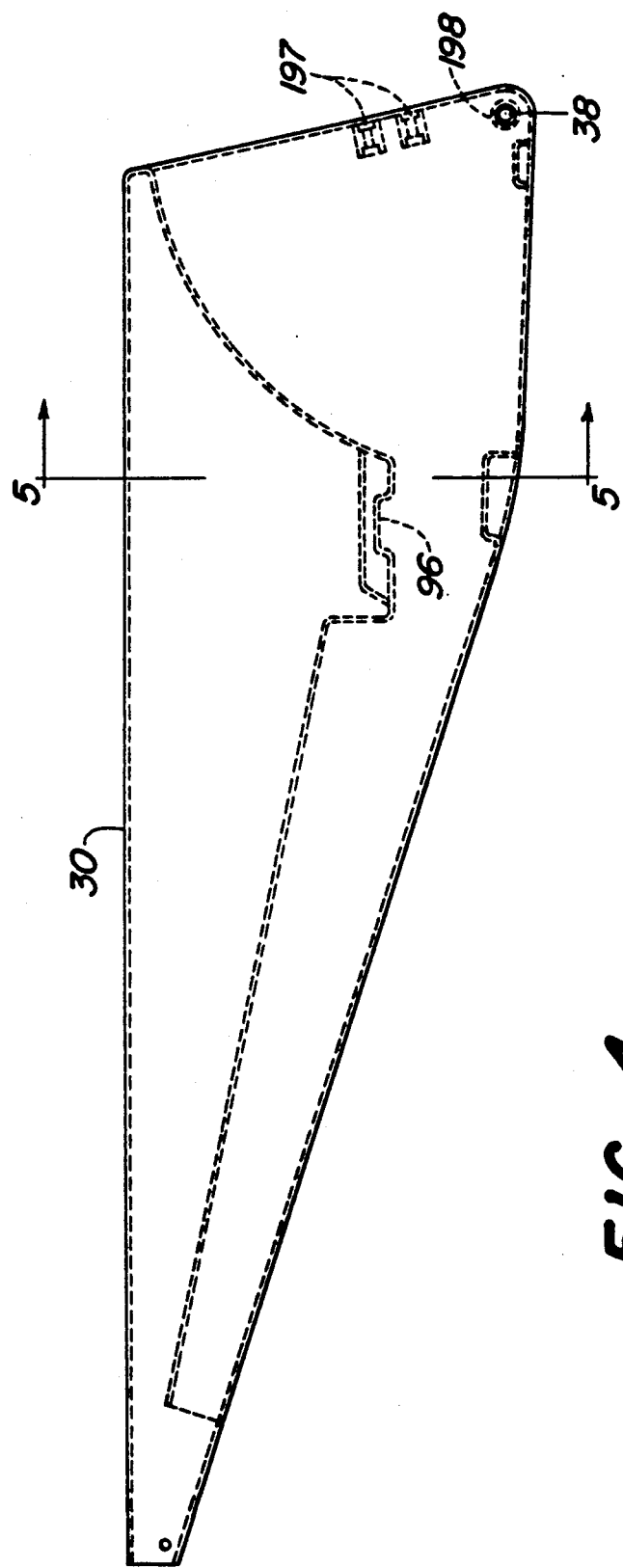
FIG. 4 is a cross sectional side view of the forward portion of the center row crop divider.
Figure 5:
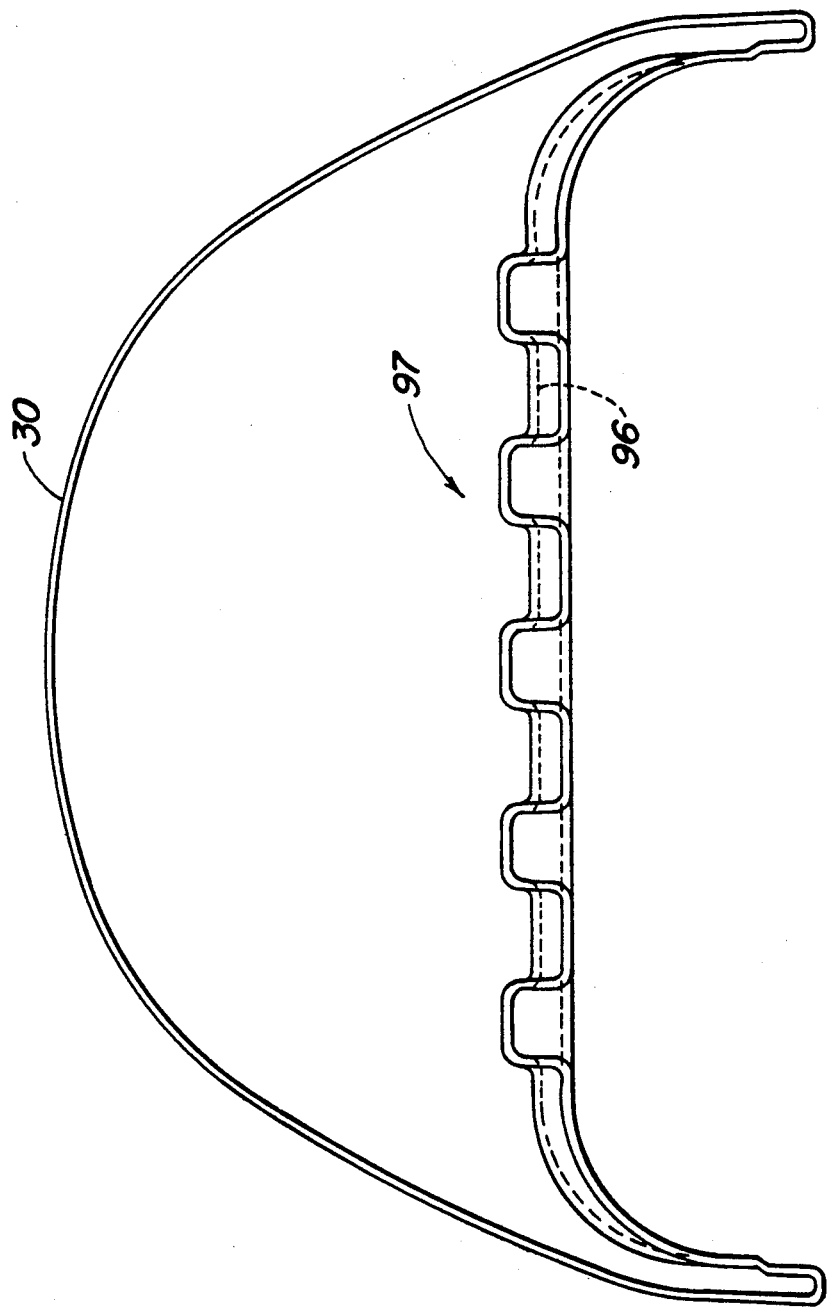
FIG. 5 is a cross sectional view taken along line 4—4.
Figure 6:
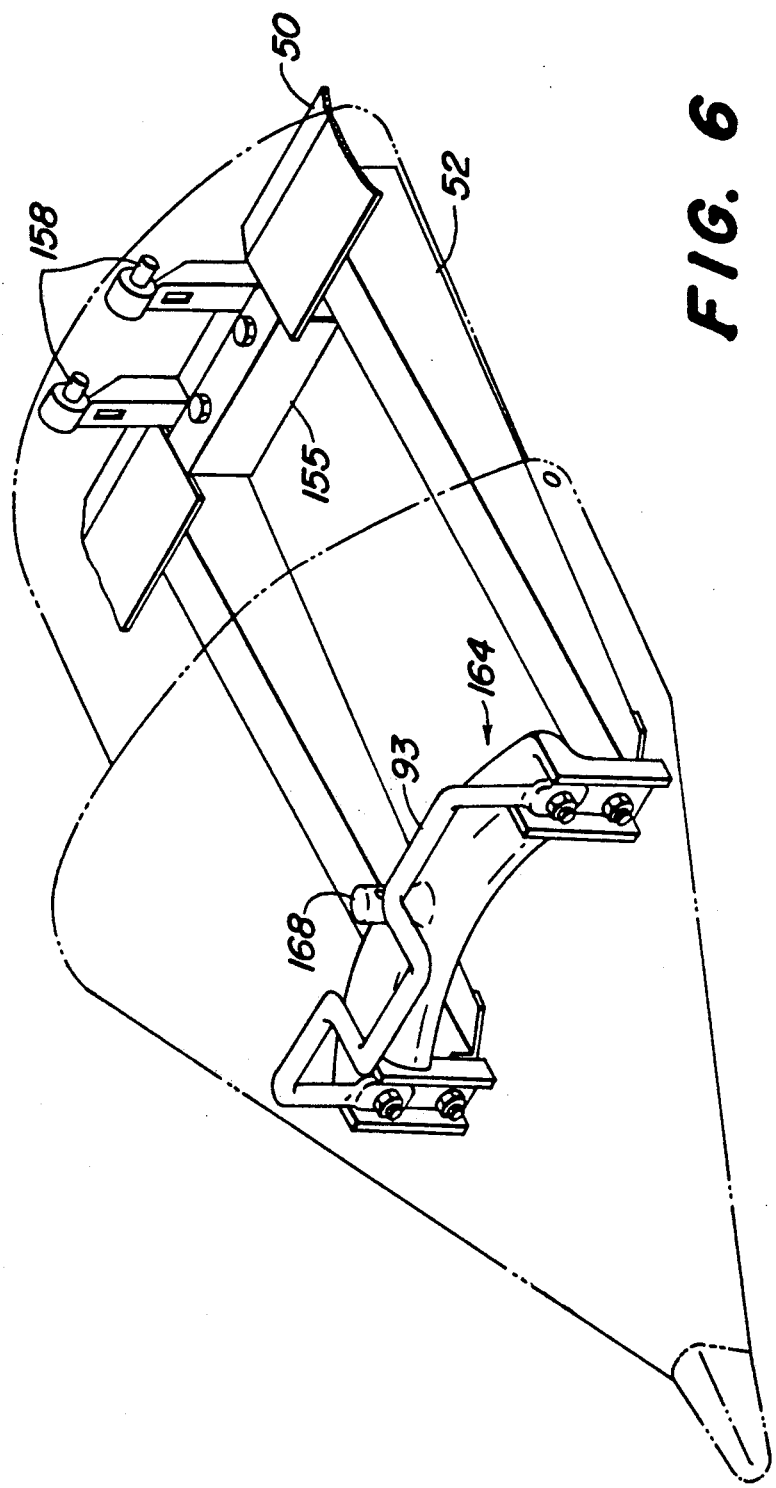
FIG. 6 is an assembled perspective view of the center row crop divider.

As best seen in FIGS. 4 and 5, the semiconical portion is provided with a flat seating surface 96 which rests on support surface 93. The area about the seating surface is strengthened against bending forces by forming castellations 97 in the bottom surface of the semiconical portion.

The semiconical portion 30 is provided with a flat rubber member 74 that is bolted to the rear surface of the semiconical portion by bolts 76. Member 74 projects outwardly from the side of the semiconical portion into the adjacent crop gathering gap 16. The flat member together with another flat member from the adjoining center row crop divider 14 form an ear gate to prevent an ear of corn from rolling down the gathering chain and out the front of the harvesting platform.

The base 84 of the semiconical portion, that adjoins the semicylindrical portion, is larger than the semicylindrical portion creating a step that forms an ear saver to prevent ears of corn from rolling down the dividers.

The end row crop dividers 12 tend to be pulled outwardly during a harvesting operation. A stop 56 is bolted to frame 50 for engaging the inner sidewall of the semicylindrical portion restraining this outward movement.

The center row crop divider 14 is quite similar to the end row crop dividers. Numerical designators for elements of the center row crop divider will be one hundred greater than similar elements on the end row crop divider. The center row crop divider is provided with a forward semiconical portion 130 and a semicylindrical portion 134.

The semiconical portion is pivotally coupled to the semicylindrical portion by bolts 136 that project through apertures 138 and 140. The base end of the semiconical portion is nested over the front end of the semicylindrical portion. The semiconical portion is also provided with a gathering point 132 that is bolted to the semiconical portion by bolt 142. Two flat rubber members 174 are bolted to the semiconical portion by bolts 176. These flat portion form ear gates in the crop gathering gaps.

The base end of the semicylindrical portion is pivotally coupled to a first mounting assembly 154 by mounting pins 158. The semicylindrical portion is trapped on mounting pins 158 by clip 162 that is bolted to semicylindrical portion 134 and prevents transverse movement of portion 134 on pins 158. The first mounting assembly is sandwiched between mounting plates 155 and secured to frame 50 by bolts 157. The base end of the semicylindrical portion is provided with wear plates 180 secured thereto by bolts 182.

A second mounting assembly 164 is bolted to forwardly extending arms 52 by two bolts 166, only one shown. It is provided with upwardly extending pin 168 that engages aperture 170 on the semicylindrical portion 134. A cotterpin 172 secures the semicylindrical portion to the upwardly extending pin. A supporting rail 190 for semiconical portion 134 is bolted to the second mounting assembly 164 by bolts 191, only one shown. The bolts 191 pass through elongated apertures 192. As with the end row crop divider, rail 190 is provided with a supporting surface 193 for the semiconical portion. The vertical position of the rail and thereby the divider can be changed by loosening and tightening bolts 191.

The center row crop divider is provided with an ear saver structure similar to the one used on the end row crop dividers except that the enlarged portion 184 is located at the forward end of the semicylindrical portion 134 instead of the rear of the semiconical portion. The base end of the semiconical portion fits over this enlarged portion.

In transporting the harvesting platform it maybe desirable to retract the dividers. The dividers can be retracted by removing cotterpins 72 and 172 and rotating the semicylindrical portions 34 and 134 upwardly about mounting pins 58 and 158. The semiconical portions 30 and 130 then jackknife inwardly. To hold the folded dividers in their jackknifed positions, the second mounting assemblies 64 and 164 are provided with holding notches 99 and 199 into which the gathering points 32 and 132 are inserted.

The semiconical portions 30 and 130 and the semicylindrical portions 34 and 134 are hollow double walled self-supporting polyethylene structures formed by roto molding. The hollow double walled configuration provides a self supporting structure that does not require an underlying framework to provide the dividers shape. In addition, such a structure reduces the number of parts necessary in providing plastic crop dividers.

During the molding process metal reinforcing inserts are molded into the plastic. An example of the finished roto molded end crop divider semiconical portion is illustrated in FIGS. 4 and 5. Metal bushings 198 are molded into the plastic for receiving bolts 36 and screw threadings 197 are molded into the plastic for receiving bolts 76.

For the end dividers it is desirable to inject foam into the hollow interior of the semiconical portion and the semicylindrical portion to form a more rigid divider. The foam is sprayed into the hollow interior of these portions where it expands and becomes rigid. A non-CFC polyurethane foam that is ninety-six percent closed cell has been used for filling these portions. It has been found that the end units tend to bend outwardly during harvesting operations where they may encounter fence posts and other damaging obstructions. By adding the foam the end row units become more rigid and less likely bend outward. In addition to prevent the center semiconical portions from bending underneath the platform when harvesting in tough conditions reinforcing foam can be injected into these units.

The above described row crop dividers are lighter than conventional metal row crop dividers. In addition plastic row crop dividers do not rust and maintain their original color better than metal row crop dividers. As the plastic crop dividers are more pliable than metal crop dividers there are less harvesting losses resulting from ears of corn bouncing on the metal dividers and back onto the field. During moist harvesting conditions crop material tends to adhere to metal surfaces causing potential clogging of crop gathering units. It has been found that crop material does not readily adhere to plastic crop dividers reducing the clogging of the crop gathering units.

The present invention should not be limited to the above-identified embodiments but should be limited solely to the claims that follow.

I claim:

1. A row crop header for an agricultural harvesting machine, comprising:
    a frame;
    at least two row crop dividers mounted to the frame, a gap is formed between the dividers, the dividers direct a crop into the gap, each divider is provided with a self-supporting hollow double walled plastic semiconical portion;
    gathering units for gathering the crop are mounted to the frame and are located in the crop receiving gap for gathering a crop; and
    harvesting units for harvesting the crop are mounted to the frame and are located in the gap for removing a gathered crop from a field.

2. A row crop header as defined by claim 1 wherein the semiconical portion is made of roto molded polyethylene.

3. A row crop header as defined by claim 1 wherein each crop divider is provided with a self-supporting hollow plastic semicylindrical portion that is axially aligned with and adjoins the semiconical portion.

4. A row crop header as defined by claim 3 wherein the semiconical portion and the semicylindrical portion are pivotally mounted to one another.

5. A row crop header as defined by claim 4 wherein the semiconical portion and the semicylindrical portion are made from roto molded polyethylene.

6. A row crop header as defined by claim 5 wherein the frame is provided with a transverse frame portion, a first mounting assembly is mounted to the transverse frame portion for pivotally mounting the semicylindrical portion to the frame.

7. A row crop header as defined by claim 6 wherein the frame is further provided with a forwardly extending frame portion, a second mounting assembly is mounted to the forwardly extending frame portion for mounting the semicylindrical portion to the forwardly extending frame portion.

8. A row crop header as defined by claim 7 wherein the second mounting assembly is provided with an upwardly extending pin which engages an aperture in the semicylindrical portion.

9. A row crop header as defined by claim 6 wherein the frame is further provided with a forwardly extending frame portion, a second mounting assembly having a supporting rail is mounted to the forwardly extending frame portion, the supporting rail having a support surface for engaging a seating surface located on the semiconical portion.

10. A row crop header as defined by claim 9 wherein the supporting rail is vertically adjustable relative to the second mounting assembly.

11. A row crop header as defined by claim 10 wherein the second mounting assembly is further provided with an upwardly extending pin that engages an aperture in the semicylindrical portion.

12. A row crop header as defined by claim 9 wherein the supporting rail forms a holding notch into which the semiconical portion can be inserted for transport.

13. A row crop header as defined by claim 6 wherein the frame is further provided with a forwardly extending frame portion, a second mounting assembly is mounted to the forward extending frame portion, the second mounting assembly having a holding notch into which the semiconical portion can be inserted for transport.

14. A row crop header as defined by claim 4 wherein the semicylindrical portion has an enlarged section that engages the semiconical portion and forms an ear saver.

15. A row crop header as defined by claim 4 wherein the semiconical portion is larger than the semicylindrical portion forming an ear saver.

16. A crop divider for a row crop harvesting platform, the crop divider comprising:
    a hollow double walled self-supporting plastic semicylindrical portion; and
    a hollow double walled self-supporting plastic semiconical portion pivotally coupled to the semicylindrical portion.

17. A crop divider as defined by claim 16 wherein the semicylindrical portion has a front end and a base end, and the semiconical portion has a tip and a base end, the base end of the semiconical portion nests on top of the front end of the semicylindrical portion when the crop divider is in a harvesting configuration.

18. A crop divider as defined by claim 17 wherein the front end of the semicylindrical portion is enlarged to define a step forming an ear saver.

19. A crop divider as defined by claim 18 wherein the base end of the semiconical portion is enlarged to define a step forming an ear saver.

20. A crop divider as defined by claim 17 wherein the semiconical portion is provided with a seating surface for engaging a support rail on a row crop header.

21. A crop divider as defined by claim 17 wherein the semicylindrical portion is provided with a mounting aperture located at its base end for pivotally mounting the semicylindrical portion to a row crop header.

22. A crop divider as defined by claim 17 wherein foam is injected into the hollow self-supporting plastic semiconical portion.

23. A crop divider as defined by claim 22 wherein foam is injected into the hollow self-supporting plastic semicylindrical portion.

24. A crop divider as defined by claim 17 wherein the semicylindrical portion is provided with an aperture for engaging an upwardly extending pin on a row crop header.

25. A crop divider for a row crop harvesting platform, the crop divider comprising: a hollow double walled self-supporting plastic semiconical portion having a seating surface for engaging a support rail on a row crop header and a means for pivotally mounting the semiconical portion to a semicylindrical portion of the crop divider.

26. A crop divider as defined by claim 25 wherein foam is injected into the hollow self-supporting plastic semiconical portion.

27. A crop divider for a row crop harvesting platform, the crop divider comprising: a hollow double walled self-supporting plastic semicylindrical portion having a means for pivotally mounting the semicylindrical portion to a harvesting platform and a means for pivotally mounting the semicylindrical portion to a semiconical portion of the crop divider.

28. A crop divider as defined by claim 27 wherein foam is injected into the hollow self-supporting plastic semicylindrical portion.

29. A crop divider as defined by claim 27 wherein the semicylindrical portion has an enlarged portion forming an ear saver.

30. A crop divider as defined by claim 27 wherein the semicylindrical portion is provided with a mounting aperture for securing the semicylindrical portion to an upwardly extending pin on a row crop header.

* * * * *